United States Patent [19]

Yamana

[11] 4,279,473
[45] Jul. 21, 1981

[54] REMOTE CONTROL MECHANISM

[75] Inventor: Toru Yamana, Fujieda, Japan

[73] Assignee: Murakami Kaimeido Co., Ltd., Japan

[21] Appl. No.: 135,288

[22] Filed: Mar. 31, 1980

[30] Foreign Application Priority Data

Apr. 9, 1979 [JP] Japan .................................. 54-42680

[51] Int. Cl.³ .............................................. G02B 7/18
[52] U.S. Cl. ..................................... 350/307; 74/491;
248/475 B
[58] Field of Search .................. 350/288, 307; 74/491,
74/501 M; 248/479, 481, 475 B

[56] References Cited

U.S. PATENT DOCUMENTS

| 3,245,283 | 4/1966 | Van Noord .......................... 248/479 |
| 4,152,950 | 5/1979 | Langford ............................... 74/491 |

Primary Examiner—Jon W. Henry
Attorney, Agent, or Firm—Robert E. Burns; Emmanuel J. Lobato; Bruce L. Adams

[57] ABSTRACT

A remote controlled rearview mirror assembly comprises a mirror bracket controllable by a pivotal control lever through a mechanism including a pair of first arms mounted on the control lever and a pair of second arms supporting the mirror bracket and pivotally mounted on a supporting stud spaced from the control lever and fixed to a base plate on which the control lever is pivotable. The first and second arms are connected pivotally by a pair of links at their distal ends. The mirror bracket is pivotally movable in response to pivotal movement of the control lever in a plane and to turning movement thereof about its longitudinal axis. Each of the first and second arms has a spherical surface at its end, over which there is slidably fitted a semispherical socket on one end of one of the links.

20 Claims, 13 Drawing Figures

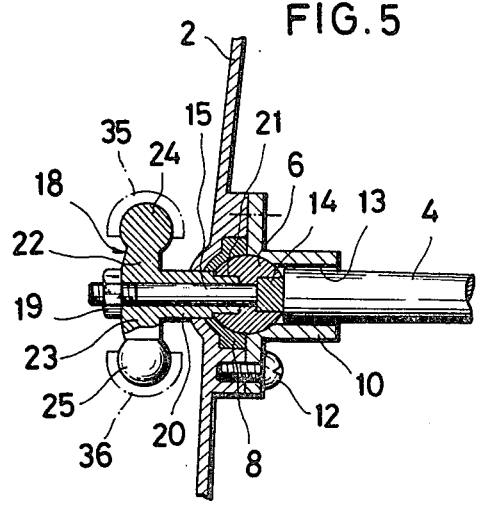
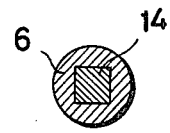
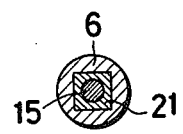
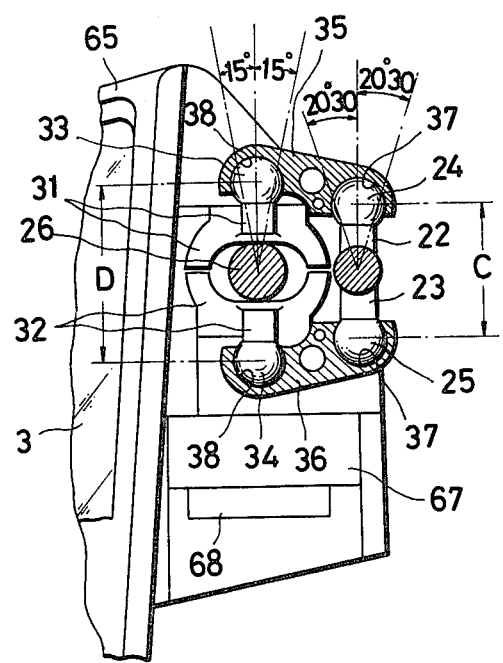

REMOTE CONTROL MECHANISM

BACKGROUND OF THE INVENTION

1. Field of the Invention

The present invention relates to a remote control mechanism, and more particularly to a remote controlled rearview mirror assembly.

2. Prior Art

Remote controlled rearview mirror assemblies to be mounted on front doors of automobiles have a mechanism for converting the motion of a control lever to the motion of a mirror. A form of such mechanism is disclosed in Deutsche Offenlegungsschrift No. 2262548. The known device utilizes a planetary gear for moving the mirror up and down in response to rotational movement of the control lever. With such planetary gear mechanism, however, the overall structure is complicated with a large number of moving parts, and tends to malfunction after repeated use or due to vibratory movements to which it is subjected while the automobile is moving.

The disclosed prior rearview mirror assembly requires a mirror attachment supporting a mirror in such a manner that the face of the mirror is inclined rearwardly for obtaining a proper rear view. The mirror supported by such mirror attachment imposes undue stresses on the planetary mechanism.

SUMMARY OF THE INVENTION

It is an object of the present invention to provide a remote control mechanism which is simple in structure, is constructed of a relatively small number of parts, and is reliable in operation.

Another object of the present invention is to provide a remote control mechanism which can support a rearview mirror at an angle for a proper rear view.

According to the present invention, a pair of first arms are mounted on a control lever supported on a base for pivotal movement with respect to the base. A supporting stud is fixed to the base in spaced relation to the control lever. A pair of second arms are pivotally supported on the supporting stud. The first and second arms are interconnected pivotally by link means, whereby the second arms are pivotable in response to the pivotal movement of the control lever. A bracket means is mounted on the second arms for supporting a controlled member.

BRIEF DESCRIPTION OF THE DRAWINGS

The above and other objects, advantages and features of the present invention will become apparent from the following description of a preferred embodiment taken in conjunction with the accompanying drawings, in which:

FIG. 5 is a cross section view taken along section line 5—5 of FIG. 3;

FIGS. 6 and 7 are cross section views of a ball taken along different section lines;

FIG. 8 is a cross section view taken along section line 8—8 of FIG. 2;

DESCRIPTION OF THE PREFERRED EMBODIMENT

Figure 1:
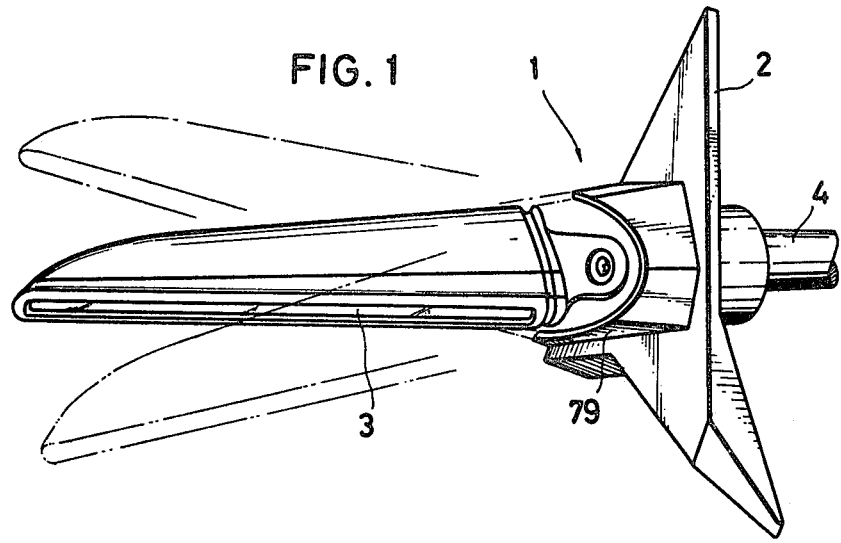
FIG. 1 is a plan view of a remote controlled rearview mirror assembly constructed in accordance with the present invention.

As shown in FIG. 1, a remote controlled rearview mirror assembly 1 generally comprises a base plate 2 to be mounted on a front door, a rearview mirror 3 pivotally mounted on the base plate 2, and a control lever 4 pivotally mounted on the base plate 2 for controlling the rearview mirror 3.

Figure 2:
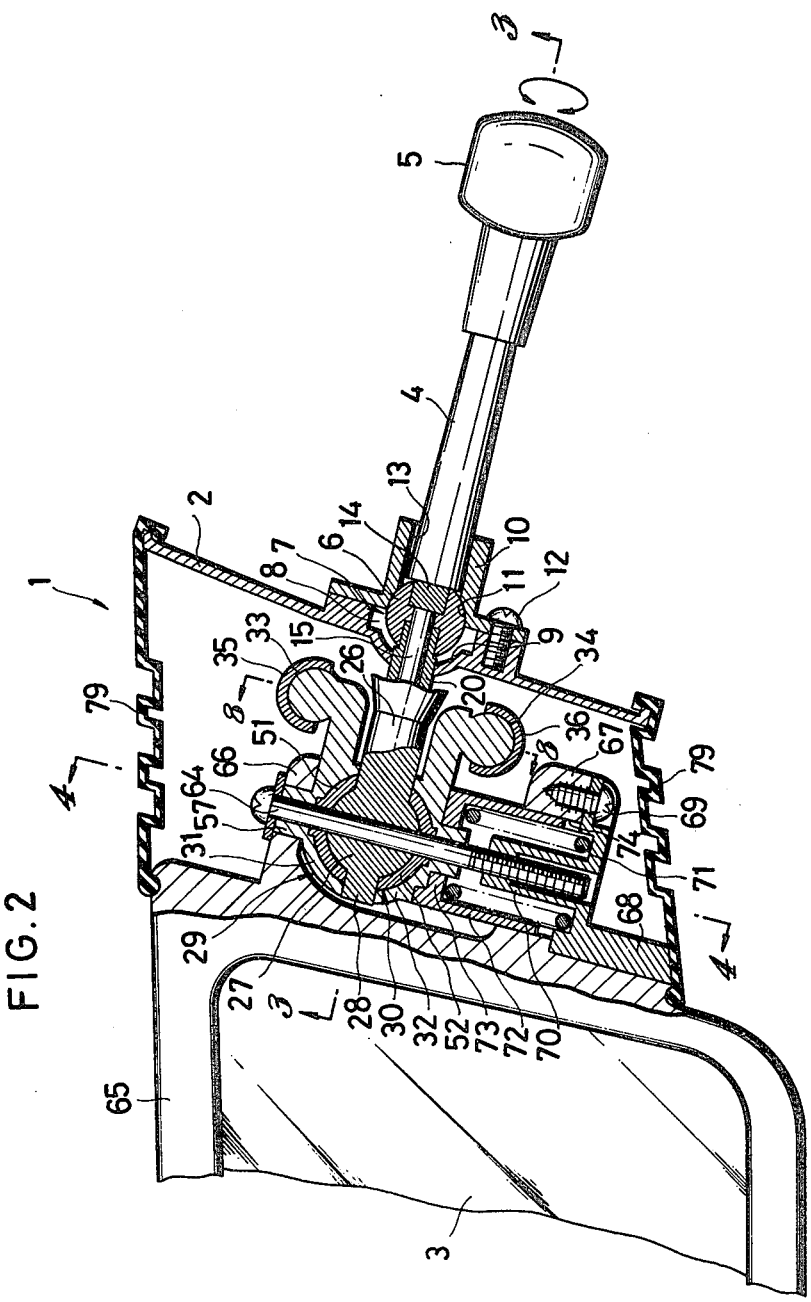
FIG. 2 is an enlarged front elevation view, with parts in vertical cross section, of the remote controlled rearview mirror assembly.
Figure 3:
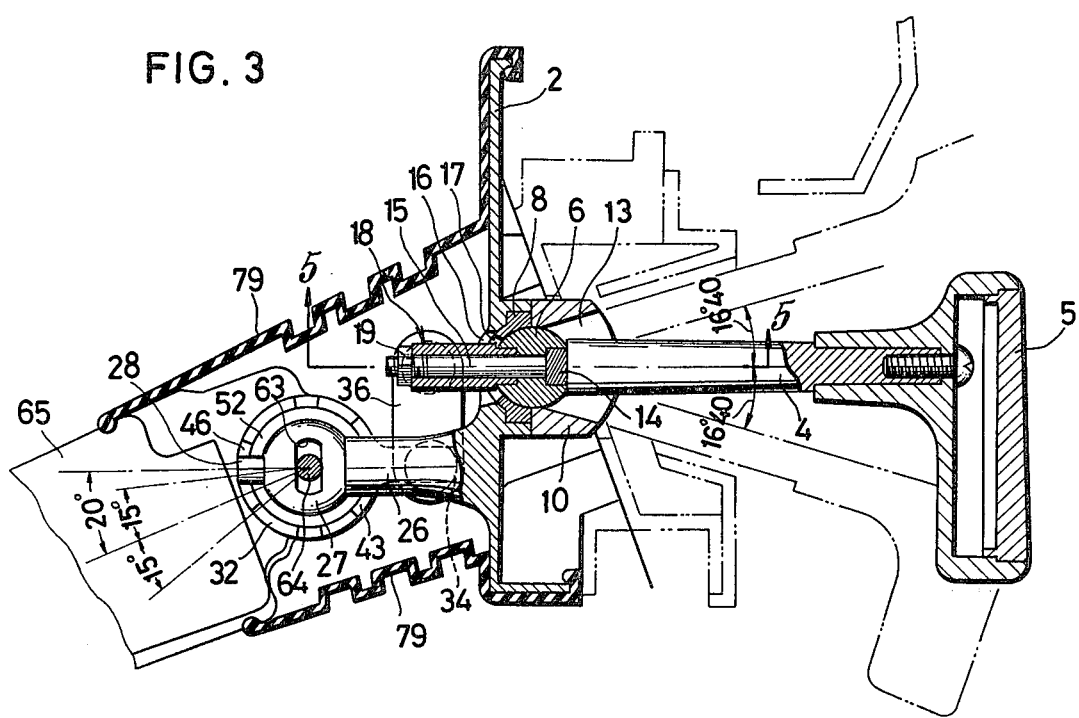
FIG. 3 is a cross section view taken along section line 3—3 of FIG. 2.

In FIGS. 2 and 3, the control lever 4 has at its one end a handle or knob 5 and at the other end a spherical ball 6 pivotally received in a socket 7 on one side of the base plate 2. The socket 7 is provided by a semispherical ball seat 8 disposed in a recess 9 on the base plate 2. A ball holder 10 has a semispherical surface 11 forming part of the socket 7 and is disposed over the semispherical ball seat 8. The ball holder 10 is fixed to the base plate 2 by a machine screw 12.

The ball holder 10 has a horizontal slot 13 through which the control lever 4 extends. The control lever 4 can pivot about the ball 6 in a horizontal plane within an angle determined by the width of the slot 13.

The control lever 4 is rotatable about its longitudinal axis and includes a square connector 14 (FIGS. 5 and 6) which is disposed in the ball 6 for corotation between the control lever 4 and the ball 6.

A rod 15 is attached to the ball 6 and extends coaxially with the control lever 4. The rod 15 projects on the other side of the base plate 2. The base plate recess 9 has a horizontal slot 16 (FIG. 2) in its bottom and the ball seat 8 has a horizontal slot 17 (FIG. 2) held in substantial alignment with the slot 16. The rod 15 extends through the slots 16, 17 away from the control lever 4. Accordingly, the rod 15 is horizontally pivotable in the slots 16, 17 in response to the pivotal movement of the control lever 4. In addition, the rod 15 is rotatable about its longitudinal axis in response to the rotational movement of the control lever 4 about its longitudinal axis.

As better shown in FIGS. 5 and 7, a substantially T-shaped first knuckle joint means 18 is fixedly mounted on the rod 15 by a nut 19 threaded over a distal end portion of the rod 15. The first knuckle joint means 18 includes a central sleeve 20 through which the rod 15 extends. The central sleeve 20 has a square end portion 21 disposed in the ball 6 for corotation between the ball 6 and the first knuckle joint means 18.

The knuckle joint means 18 includes a pair of first knuckle arms 22, 23 extending diametrically oppositely away from each other along a direction substantially normal to the horizontal plane in which the control lever 4 is pivotable. The first knuckle arms 22, 23 have a pair of first spherical surfaces 24, 25 respectively on their distal ends.

A supporting stud 26 fixed to the base plate 2 is spaced horizontally from the rod 15 and hence the control lever 4. The supporting stud 26 extends away from the control lever 4 and is disposed at the other side of the base plate 2. The supporting stud 26 has on its distal end portion a spherical member 27 spaced from the base plate 2. A coaxial projection 28 of a circular cross section projects from the spherical member 27.

A second knuckle joint means 29 is pivotally mounted on the spherical member 27 with bearing means 30 slidably interposed therebetween. The second knuckle joint means 29 comprises a pair of second knuckle arms 31, 32 having a pair of second spherical surfaces 33, 34, respectively, directed away from each other in a direction substantially parallel to the direction in which the first knuckle arms 22, 23 extend.

The first knuckle arms 22, 23 are connected pivotally to the second knuckle arms 31, 32, respectively, by a pair of links 35, 36. Each of the links 35, 36 has on its ends a pair of semispherical sockets 37, 38 which are slidably fitted over the spherical surfaces 24,33 or 25,34 of the first and second knuckle arms (FIG. 8). Thus, the first knuckle arms 24, 25, the second knuckle arms 31, 32, and the links, 35, 36 connecting the first and second knuckle arms together jointly constitute an articulated link mechanism for imparting pivotal motion to the second knuckle joint means 29 in response to the pivotal movement of the control lever 4.

Figure 9:
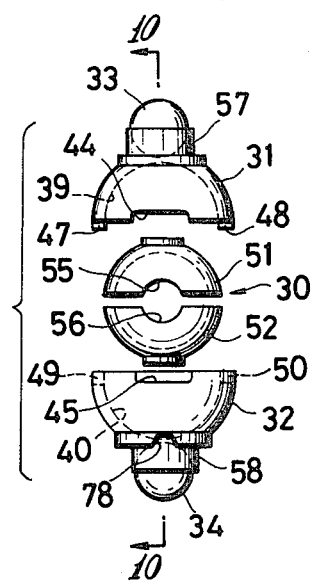
FIG. 9 is an exploded elevation view of a pair of second arms and a bearing means.
Figure 10:
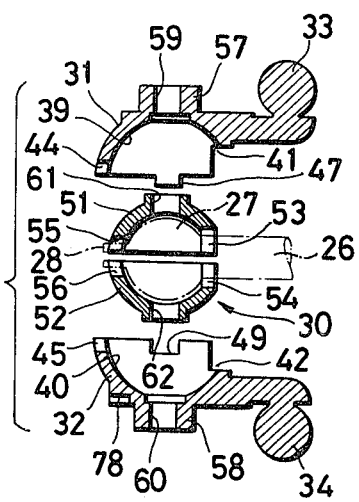
FIG. 10 is a cross section view taken along line 10—10 of FIG. 9.

As best illustrated in FIGS. 9 and 10, the first knuckle arms 31, 32 have a pair of opposed semispherical sockets 39, 40, respectively. The first knuckle arms 31, 32 also have a pair of recesses 41, 42, respectively, which jointly provide a horizontal slot 43 (FIG. 3) through which the supporting stud 26 extends, and a pair of recesses 44, 45 respectively, which jointly provide a horizontal slot 46 (FIG. 3) through which the projection 28 extends. A pair of protrusions 47, 48 are disposed diametrically opposite each other on the knuckle arm 31 and inserted in a pair of diametrically opposed indentations 49, 50, respectively, in the knuckle arms 32 so as to interlock the knuckle arms 31, 32.

The bearing means 30 comprises a pair of opposed semispherical members 51, 52 made of plastic material slidably disposed in the semispherical sockets 39, 40, respectively. The bearing members 51, 52 have a pair of recesses 53, 54, which jointly provide a circular opening through which the supporting stud 26 fittingly extends, and a pair of recesses 55, 56, which jointly provide a circular opening through which the projection 28 fittingly extends.

The second arms 31, 32 have a pair of sleeves 57, 58 with a pair of holes 59, 60 respectively therein. The semispherical bearing members 51, 52 have a pair of holes 61, 62, respectively. The holes 59, 60 and the holes 61, 62 are held in registration with one another.

The spherical member 27 on the supporting stud 26 has a through hole 63 which is registered with the holes 61, 62 in the semispherical bearing members 51, 52. The through hole 63 has an oblong cross section elongated in a direction substantially perpendicular to the supporting stud 26, as best shown in FIG. 3.

A rod 64 in the form of a bolt extends through the holes 59, 60 in the second knuckle arms 31, 32, the holes 61, 62 in the semispherical bearing members 51, 52, and the through hole 63 in the spherical member 27. The second knuckle arms 31, 32 are pivotable together about the rod 64 and slidable on the semispherical bearing members 51, 52 for an angle determined by the slots 43, 46. Thus, the exterior peripheral surfaces or convex surfaces of the semispherical bearing members 51, 52 provide a bearing surface on which the second knuckle arms 31, 32 are movable. The second knuckle arms 31, 32 and the semispherical bearing members 51, 52 are turnable together by the rod 64 about the spherical member 27 for an angle determined by the elongated cross section of the through hole 63 in the spherical member 27. Thus, during such turning movement of the second knuckle arms 31, 32, a bearing surface is provided by the interior peripheral surfaces or concave surfaces of the semispherical bearing members 51, 52.

A bracket 65 holding the mirror 3 has a pair of spaced bracket arms 66, 67. The bracket arm 66 is rotatably mounted on the sleeve 57 of the second knuckle arm 31. A spring holder 68 is attached to the bracket arm 67 by a screw 69. The spring holder 68 has a boss 70 with which a threaded portion of the rod 64 threadedly engages.

A compression coil spring 71 is disposed in a state of compression between the spring holder 68 and the second knuckle arm 32 to support the second knuckle arms 31, 32 and the semispherical bearing members 51, 52 in an assembled form on the spherical member 27. The spring 71 is received in a tubular spring cap 72 having a bottom 73 and has its one end acting on the bottom 73. The bottom 73 of the spring cap 72 is normally held against the second knuckle arm 32. The spring cap 72 is partly disposed in an opening 74 in the bracket arm 67 and is held concentrically with the rod 64. The spring cap 72 is axially movable along the rod 64. The spring cap 72 has a key 75 (FIG. 11) slidably received in a slot 76 in the bracket arm 67. Thus, the spring cap 72 is held nonrotatable about the rod 64 with respect to the bracket arm 67.

Figure 11:
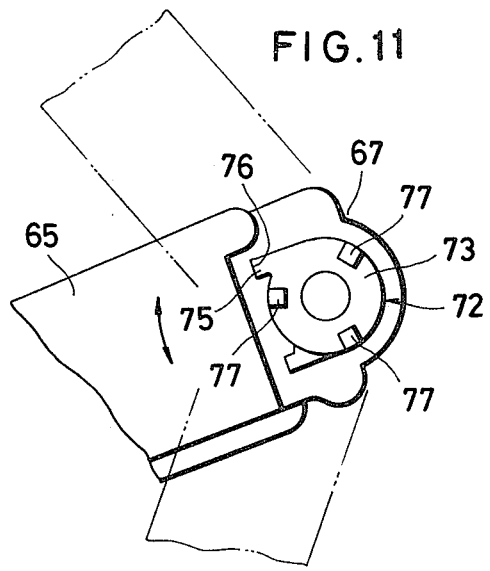
FIG. 11 is a plan view of a spring cap as mounted on a bracket.
Figure 12:
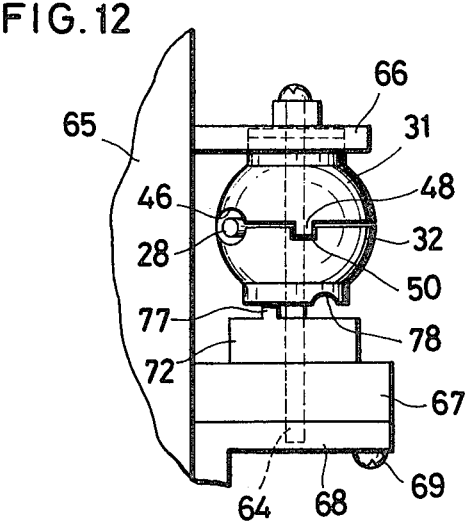
FIG. 12 is an elevation view of the pair of second arms as mounted on the bracket.

As better shown in FIGS. 11 and 12, the spring cap 72 has on its bottom 73 a plurality of projections 77 angularly spaced at equal distances from adjacent projections and received in a plurality of corresponding positioned notches 78 in the second knuckle arm 32.

With this arrangement, the bracket arms 66, 67 are rotatable with respect to the second knuckle arms 31, 32 upon forced movement of the projections 77 out of the notches 78 (FIG. 12) against the force of the spring 71 when the bracket 65 is subjected to forces tending to turn the bracket 65 about the rod 64. Accordingly, the bracket 65 can yield under excessive undue forces applied thereon without being broken or deformed.

A cover 79 of rubber is attached to the base plate 2 and the bracket 65 in surrounding relation to the structure described that operatively connects the control lever 4 to the bracket 65.

The remote control rearview mirror assembly 1 operates as follows: When the control lever 4 is caused to pivot about the ball 6 in a horizontal plane, the first knuckle arms 22, 23 pivot about the ball 6 in the same horizontal plane. The second knuckle arms 31, 32 are caused through the links 35, 36 to pivot about the spherical member 27 on the supporting stud 26 in the same horizontal plane, whereupon the bracket arms 66, 67 move with the second knuckle arms 31, 32. Accordingly, the mirror 3 held by the bracket 65 moves horizontally in response to the pivotal movement of the control lever 4.

The horizontal pivotal movement of the mirror 3 is limited by the length of the slot 46 jointly provided by the second knuckle arms 31, 32.

During such pivotal movement of the second knuckle arms 31, 32, the semispherical bearing members 51, 52 remain immovable on the spherical member 27 on the supporting stud 26.

Figure 13:
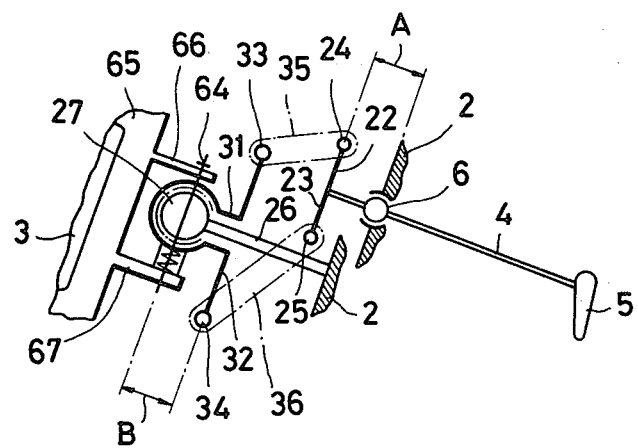
FIG. 13 is a schematic view of the remote control mechanism.

As shown in FIG. 13, the center of the ball 6 is spaced by a distance A from the line connecting the centers of the spherical surfaces 24, 25, and the center of the spherical member 27 is spaced by a distance B from the line connecting the centers of the spherical surfaces 33, 34. Assuming that the distance A is selected to be 18 mm, and the distance B is selected to be 20 mm, a ratio of angular movement of the control lever 4 to that of the mirror 3 is 20/18=1.11. In this case, when the control lever 4 is angularly moved through 16.40 degrees in either direction from a neutral position, the mirror 3 is angularly moved through 15 degrees as illustrated in FIG. 3.

Figure 4:
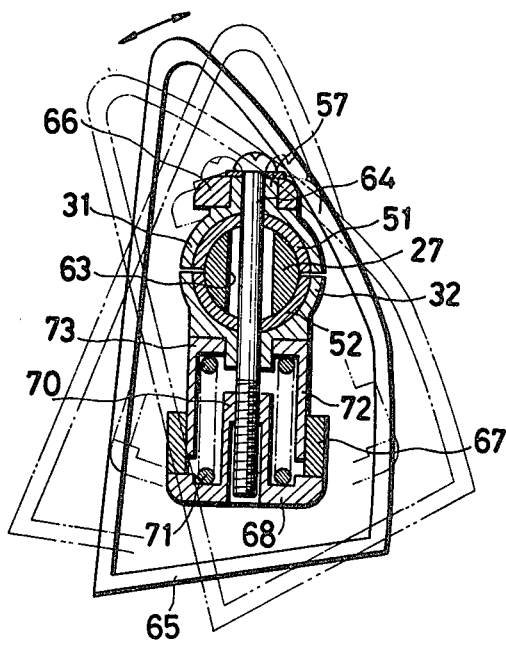
FIG. 4 is a cross section view taken along section line 4—4 of FIG. 2.

When the control lever 4 is turned about its longitudinal axis, the first knuckle arms 22, 23 swing about the rod 15. The second knuckle arms 31, 32 are caused to swing about the spherical member 27 through the links 35, 36, whereupon the mirror bracket 65 swings with the second knuckle arms 31, 32 vertically. At this time, the semispherical bearing members 51, 52 slide with the second knuckle arms 31, 32 on the spherical member 27. The turning movement of the second knuckle arms 31, 32 and hence the mirror bracket 65 is limited by the length of the oblong cross section of the hole 63 through which the rod 64 extends with clearance, as best shown in FIG. 4.

In FIG. 5, the centers of the spherical surfaces 24, 25 are spaced by a distance C from each other, and the centers of the spherical surfaces 33, 34 are spaced by a distance D from each other. Assuming that C/2 is selected to be 11 mm and D/2 is selected to be 15 mm, a ratio of swinging movement of the first knuckle arms 22, 23 to that of the second knuckle arms 31, 32 is 15/11=1.36. With this ratio, when the control lever 4 is turned about its longitudinal axis through 20.30 degrees in either direction from a neutral position, the mirror 3 swings through 15 degrees. Accordingly, fine adjustment in movements of the mirror 3 is possible.

The mirror 3 has a larger resistance to its horizontal pivotal movement than to its vertical swinging movement so as to withstand wind pressure imposed thereon while the automobile to which the mirror assembly 1 is attached is running. More specifically, during the horizontal pivotal movement of the mirror 3, the second knuckle arms 31, 32 slide on the convex exterior surface of the spherical member 27 which provides a larger frictional area of contact than the concave interior surface of the spherical member 27, which serves as a bearing surface when the second knuckle arms 31, 32 swing about the spherical member 27 to vertical swinging movement of the mirror 3. The thickness of the semispherical bearing members 51, 52 can be changed to produce various torque differences between the horizontal pivotal movement and vertical swinging movement of the mirror 3.

As shown in FIG. 3, the mirror bracket 65 as it is mounted can be directed obliquely rearwardly with respect to the base plate 2, so that the mirror 3 can be disposed at an angle for a rear view without requiring any intermediate mirror attachment.

Although a preferred embodiment has been shown and described in detail, it should be understood that various changes and modifications can be made therein without departing from the scope of the appended claims.

What is claimed is:

1. A remote control mechanism comprising:
   (a) a base;
   (b) a control lever supported on said base for pivotal movement with respect thereto;
   (c) a pair of first arms mounted on said control lever;
   (d) a supporting stud fixed to said base and spaced from said control lever;
   (e) a pair of second arms pivotally supported on said supporting stud;
   (f) link means pivotally connecting said first and second arms, whereby said second arms are pivotable in response to the pivotal movement of said control lever; and
   (g) bracket means mounted on said second arms for supporting a controlled member.

2. A remote control mechanism according to claim 1; said control lever having a ball at one end thereof, said base including a holder having a socket portion for receiving and pivotally mounting the ball at the end of said control lever, and said holder having a slot through which said control lever extends and which is configured for confining said control lever to pivotal movement about said ball and in a plane and rotation about its longitudinal axis.

3. A remote control mechanism according to claim 2, including; a rod mounted on said ball and extending away from said control lever, said base having a second slot at said socket portion through which said rod extends, said second slot confining said rod to pivotal movement about said ball in said plane, and said first arms being fixed to said rod.

4. A remote control mechanism according to claim 2, said first arms extending away from each other in a direction substantially normal to said plane.

5. A remote control mechanism according to claim 1; said link means comprising a pair of links having their respective ends pivotally connected to said first and second arms at the distal ends of said first and second arms.

6. A remote control mechanism according to claim 5; each of said first and second arms having a spherical surface at its distal end, and each of said links having a pair of semispherical sockets on its respective ends which are slidably fitted over the spherical surfaces at the ends of one pair of said first and second arms.

7. A remote control mechanism according to claim 1; said supporting stud having a spherical member, said second arms having a pair of opposed semispherical sockets slidably receiving said spherical member, and the remote control mechanism including means interconnecting said second arms for holding said semispherical sockets on said spherical member.

8. A remote control mechanism according to claim 7; said spherical member including a projection extending therefrom, said semispherical sockets jointly having a slot which receives said projection therein, and said slot confining said second arms to pivotal movement about said spherical member in a second plane.

9. A remote control mechanism according to claim 8; said spherical member having a through hole extending therethrough, said interconnecting means comprising a rod extending through said second arms and loosely through said through hole to allow said second arms to turn about said spherical member.

10. A remote control mechanism according to claim 9; said through hole extending in a direction substantially normal to said second plane, whereby said second arms are pivotable about an axis susbstantially normal to said second plane.

11. A remote control mechanism according to claim 7, including bearing means defining bearings disposed between said spherical member and said opposed semispherical sockets.

12. A remote control mechanism according to claim 11; said bearing means comprising a pair of opposed semispherical members slidably disposed respectively in said semispherical sockets, and said spherical member being slidably fitted in said semispherical members.

13. A remote control mechanism according to claim 12, said spherical member including a projection extending through said semispherical members, said semispherical sockets jointly having a slot which receives said projection therein, and said slot confining said second arms to pivotal movement about said semispherical members about an axis.

14. A remote control mechanism according to claim 13; said spherical member having a through hole, said interconnecting means comprising a rod extending through said second arms and said semispherical members and loosely through said through hole to allow said second arms and said semispherical members to turn about said spherical member.

15. A remote control mechanism according to claim 14; said through hole extending in a direction substantially normal to said axis, whereby said second arms are pivotable about a second axis substantially normal to the first-mentioned axis.

16. A remote control mechanism according to claim 7; said bracket arms pivotally supported on said second arms, respectively, said bracket arms being pivotable on said second arms about an axis, including spring means acting between one of said second arms and one of said bracket arms for urging said opposed semispherical sockets against said spherical member.

17. A remote control mechanism according to claim 16; said spring means including a spring and a spring cap movably mounted on said one of said bracket arms, said spring cap having a bottom normally held against said one of said second arms by said spring.

18. A remote control mechanism according to claim 17; said bottom of said spring cap having a projection, said one of said second arms having a notch in which said projection is normally received, said spring cap being movable along said axis and nonrotatable about said axis, whereby said bracket arms are pivotable with respect to said second arms when said projection disengages said notch.

19. A remote controlled rearview mirror assembly for use on a vehicle body, comprising:
 (a) a base for attachment to the vehicle body;
 (b) a control lever supported by said base for pivotal movement in a plane and for turning movement about its own longitudinal axis, said control lever having a knob at its one end;
 (c) a pair of first arms mounted on the other end of said control leverl;
 (d) a supporting stud fixed to said base and spaced from said control lever;
 (e) a pair of second arms pivotally supported on said supporting stud;
 (f) link means for pivotally connecting said first and second arms at their distal ends, whereby said second arms are pivotable in a second plane and turnable about an axis disposed in said second plane in response to pivotal and turning movement of said control lever;
 (g) a bracket mounted on said second arms; and
 (h) a rearview mirror mounted on said bracket.

20. A remote control mirror assembly comprising:
 (a) a base plate;
 (b) a control lever supported on said base for pivotal movement, said control lever having a knob at its one end disposed at one side of said base plate;
 (c) a pair of first arms fixedly mounted on said control lever at the other end of said control lever disposed at the other side of said base plate;
 (d) a supporting stud fixed to said base plate and spaced from said control lever, said supporting stud being disposed at said other side of said base plate and extending away from said knob on the control lever;
 (e) a pair of second arms pivotally supported on said supporting stud;
 (f) a pair of spaced links pivotally connecting said first and second arms at their respective ends, whereby said second arms are pivotable on said supporting stud in response to the pivotal movement of said control lever; and
 (g) a mirror unit mounted on said second arms.

* * * * *